March 10, 1964 T. KRZEWINA 3,124,157
CONJOINTLY OPERATED COUPLING AND VENT VALVE
Filed Dec. 31, 1962

INVENTOR.
Thomas Krzewina
BY Andrew G. Hubbard
Atty.

United States Patent Office 3,124,157
Patented Mar. 10, 1964

3,124,157
CONJOINTLY OPERATED COUPLING
AND VENT VALVE
Thomas Krzewina, Milwaukee, Wis., assignor to General
Electric Company, a corporation of New York
Filed Dec. 31, 1962, Ser. No. 248,625
5 Claims. (Cl. 137—583)

This invention relates to a coupling and more particularly to a coupling which is designed to connect a faucet to a receiver.

The subject invention, while having many applications as a fluid coupling, is particularly useful in portable dishwashers, in which the dishwasher inlet hose is connected to a kitchen sink faucet. Just as in the permanently plumbed-in type, portable dishwashers have time-cycle devices to conduct the dishwasher through a series of operations including admitting the necessary amount of water for washing and rinsing the dishes. A solenoid operated valve is commonly employed to control water flow into the dishwasher; at the completion of the time allotted for filling, the valve is closed, thereby placing the inlet hose under pressure, for the sink faucet remains open. Even at the completion of the final drying operation of the dishwasher, water under pressure remains in the hose; and although the user may turn the sink faucet off before removing the coupling, the sudden release of pressure attending the removal of the coupling causes squirting and spraying of the water from the hose. Thus it is desirable to provide means for relieving the water pressure in the inlet hose prior to disconnection of the coupling from the faucet to prevent such squirting or spraying.

While couplings are in use which provide separate means for the relief of such water pressure within a dishwasher coupling prior to disconnection of the coupling from the faucet, the absentminded or inexperienced operator occasionally fails to utilize the pressure relief means prior to disconnection of the coupling resulting in the above-noted annoyances.

Couplings have also been designed which attempt to insure the relief of water pressure within the coupling prior to disconnection of the coupling from the faucet. However, these couplings appear highly complex, embodying a large number of moving parts and being very expensive to manufacture.

My invention eliminates the above-mentioned problem by insuring relief of fluid pressure within the coupling as a necessary, simply performed, preliminary step in the disconnection of the coupling from the faucet, and embodies a coupling of simple construction.

It is therefore an object of my invention to provide an improved coupling for connecting a faucet to a receiver.

It is another object of my invention to provide a faucet coupling which prevents the disconnection of the coupling from the faucet prior to relief of pressure in the coupling.

It is a still further object of my invention to provide such a coupling which has a minimum number of parts.

It is yet another object of my invention to provide a coupling for connecting a faucet to a receiver in which any fluid pressure within the coupling may be relieved and disconnection of the coupling from the faucet accomplished in a single manual operation.

In carrying out the objects of my invention in one form thereof, a coupling includes an adapter and a body to which the inlet hose or other receiver may be attached. The adapter is designed to be permanently secured to a faucet, and the body provides an inlet for removable connection to the adapter, such removable connection being accomplished by resilient means secured to the body and engageable with the adapter. An assembly is mounted on the body for lateral movement with respect thereto. When the body is to be removed from the adapter, a simple inward movement of this assembly successively opens a valve means in the body to relieve pressure in the body and releases the resilient means from the adapter, whereupon the body can be withdrawn from the adapter only after the pressure in the hose has dropped to a level which precludes the annoying spraying or splashing.

Various other objects and advantages of my invention will be clearly apparent from the following detailed description of one embodiment of my invention when considered in connection with the accompanying drawing, in which.

Figure 1:
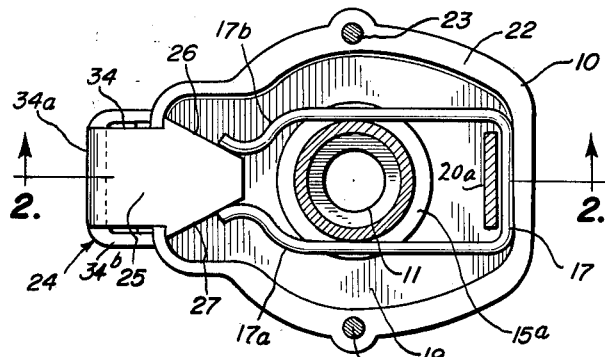
FIG. 1 is a top view of the coupling, taken in section on lines 1—1 of FIG. 2.
Figure 2:
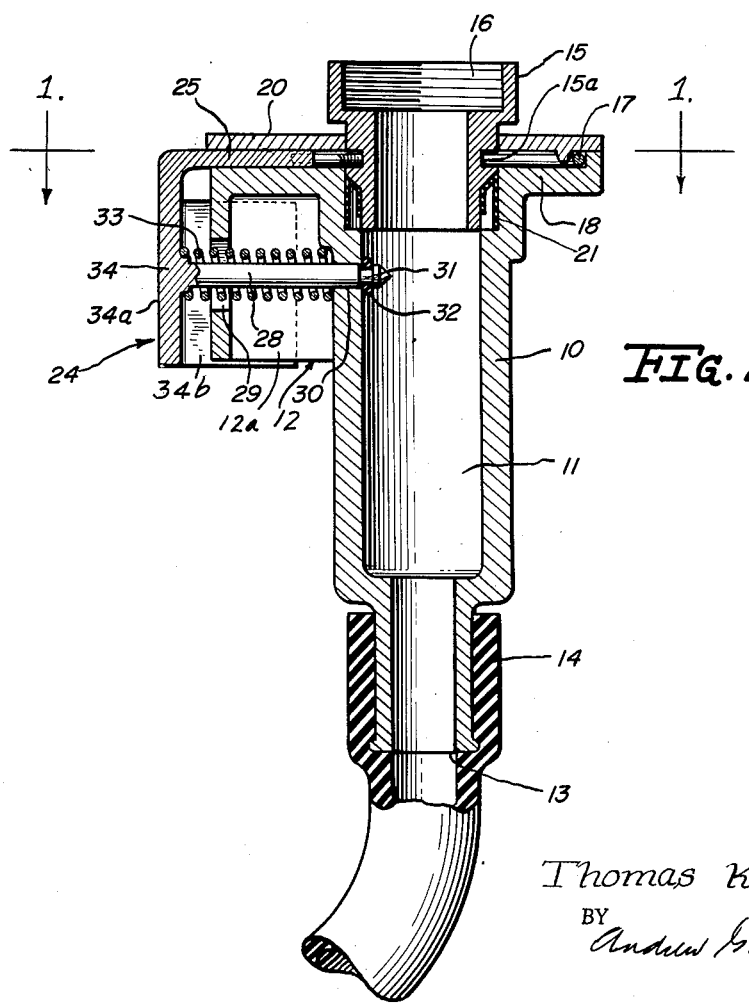
FIG. 2 is a sectional view of the assembled coupling and adapter, taken along line 2—2 of FIG. 1.

Referring now to the drawing, FIGS. 1 and 2 illustrate one embodiment of the invention. The coupling includes a body 10 of molded plastic or other suitable rigid material. The body provides a tubular inlet chamber 11. An integral structure 12 having a solid top and spaced sidewalls 12a provides a pressure relief passage, as later described. The lower portion of body 10 provides an outlet 13 which may be connected to a receiver (not shown) by a hose 14. For purposes of description it will be assumed that the receiver is a portable dishwasher.

The coupling also includes an adapter 15 which is adapted to be connected to a faucet (not shown) by means of threads 16. In order to removably secure body 10 to adapter 15, a U-shaped spring 17 is utilized. Spring 17 is mounted within a pocket provided in an enlarged head at the top of the body 10, said pocket being defined by the flat base wall 19 and the peripheral wall 20. A cover 20 rests upon wall 20, and is secured thereto by screws or rivets 23. The cover may have a rib 20a to insure the operating position of spring 17. The adapter 15 passes through the cover, it being unnecessary to seal this passage because of the pressure-activated seal 21 disposed about the adapter at the lower end thereof. The adapter has a peripheral groove 15a within which the legs 17a and 17b of attachment spring 17 seat when the coupling is in its operating position on the adapter.

To effect relief of pressure and subsequent release of the coupling in one simple operation, a push button assembly 24 of F-shaped cross-section, is mounted on the body 10. The assembly 24 includes an upper lateral projection 25 which is slidable between cover 20 and the surface 19 to engage the free ends of spring arms 17a and 17b. Projection 25, as can be seen in FIG. 1, is wedge-shaped, providing tapered lateral surfaces 26 and 27. The free ends of spring arms 17a and 17b are flared for engagement with the surfaces 26 and 27. The lateral inward movement of projection 25 (to the right in the drawing) causes the surfaces 26 and 27 thereof to spread the spring arms 17a and 17b, releasing the arms from engagement in groove 15a of adapter 15. This of course permits the separation of body 10 from adapter 15.

Assembly 24 additionally includes an integral valve 28 which extends laterally through aperture 29 in pressure relief structure 12 and through relief port 30 in body 10. The free end of valve 28 resides in chamber 11 of the coupling body and incorporates a groove 31 in which is mounted O-ring 32. In the normal position shown in FIG. 2, O-ring 32 seals relief port 30 closed. Coil spring 33 encircles valve 28 between the inner vertical surface of assembly 24 and the outer vertical surface of coupling body 10 to bias the valve 28 to the closed position.

Assembly 24 also includes an integral vertical portion 34 which connects projection 25 to valve 28 and provides a vertical actuating surface 34a for thumb operation of the assembly. Side walls 34b ride on the side walls 12a of the structure 12 to stabilize the sliding movement of the assembly 24.

It is to be understood that the invention need not be limited to the use of a peripheral groove 15a in the surface of adapter 15, as it can be seen that a pair of opposing recesses would suffice to engage spring arms 17a and 17b. It should also be noted that my invention contemplates the elimination of the adapter 15 through the provision of the desired recesses in the spout of the faucet itself.

For normal household use in coupling a faucet discharge outlet to a portable dishwasher, the adapter 15 may remain secured to the faucet by means of threads 16. The coupling body 10, with assembly 24 mounted thereon, is connected to the adapter 15 when it is desired to utilize the dishwasher. The connection is effected by bringing coupling body 10 upwardly into engagement with the bottom of adapter 15. By pushing body 15 upwardly with a slight force the arms 17a and 17b of spring 17 are forced apart and then snap into groove 15a, securing the body 10 to the adapter 15. The engagement of the spring arms in groove 15a may be facilitated by pressing assembly 24 inwardly to cause projection 25 to spread spring arms 17a and 17b. The release of the pressure applied to surface 34 of assembly 24 will seat spring 17 in groove 15a, securing the body 10 to adapter 15.

The operation of the coupling is as follows: During the fill cycle of the dishwasher, the faucet is turned on, discharging water through adapter 15, chamber 11 of the coupling body and inlet hose 14 to the dishwasher. Upon completion of the fill cycle, a valve, which may be of the solenoid-actuated type, closes, preventing the flow of liquid from hose 14 to the dishwasher. At this time it is clear that water pressure from the faucet exists in the coupling and this pressure will remain in the coupling even though the faucet is turned off.

To disconnect the coupling body 10 from adapter 15, it is necessary to move assembly 24 inwardly to cause the tapered surfaces 26 and 27 of projection 25 to spread resilient arms 17a and 17b, thereby releasing spring 17 from the groove 15a.

The parts of the coupling are so arranged that relief of pressure within body 10 is assured prior to release of the body from adapter 15. Immediately upon the lateral movement of assembly 24 to the right as viewed in the drawings, valve 28 also moves to the right. Thus when pressure is exerted on surface 34 the valve 28 immediately moves to the right carrying O-ring 32 away from its sealing position adjacent relief port 30 to relieve any pressure within the body 10 through relief port 30. The water which is discharged through the relief port is directed downwardly by the walls of the pressure relief structure 12 into the sink or other receptacle. The taper of surfaces 26 and 27 of projection 25 is designed to delay the release of spring arms 17a and 17b from groove 15a until relief of pressure within body 10 has been accomplished. Thus the invention prevents release of body 10 from adapter 15 prior to relief of water pressure within the coupling, eliminating the nuisance and irritation caused in prior couplings in which the coupling could be inadvertently released from the faucet without prior relief of pressure therein.

Furthermore, this invention provides an inexpensive coupling utilizing a minimal number of elements while automatically relieving any fluid pressure within the coupling prior to release of the coupling from the source of water pressure. Also, the subject coupling is designed for ready use by the housewife. Merely by grasping the coupling body 10 with one hand and operating the push button assembly 24 in a natural manner with the thumb of that hand, the housewife can either secure the coupling to the faucet or release the coupling from the faucet while additionally relieving any water pressure therein in a single operation. Thus this coupling provides an inexpensive means for assuring convenient foolproof connection of a receiver to a faucet.

While I have shown and described a specific embodiment of my invention, I do not desire my invention to be limited to the particular construction which is shown and described. Instead, I intend, by the appended claims, to cover all modifications within the spirit and scope of my invention.

What is claimed as new and desired to be secured by Letters Patent of the United States is:

1. A coupling for connecting a receiver to a tubular fixture adapted to be connected to a source of fluid under pressure,
   (a) means providing a recess extending transversely of said fixture;
   (b) a body having an inlet for receiving fluid flow from said fixture and an outlet for connection to said receiver;
   (c) resilient means secured to said body and engageable in said recess to secure said body to said fixture with the inlet of said body in communication therewith;
   (d) normally closed valve means communicating with said body for relieving fluid pressure therein; and
   (e) unitary means extending laterally from said body for actuating both said valve means and said resilient means,
   (f) said unitary means being manually movable in a single direction for first actuating said valve means to relieve pressure within said body and thereafter effecting disengagement of said resilient means.

2. A coupling for connecting a faucet to a receiver comprising:
   (a) an adapter for connection to the faucet, said adapter having a pair of recesses on its outer surface;
   (b) a body having an inlet for connection to said adapter and an outlet for connection to said receiver;
   (c) a U-shaped spring secured to said body and having a pair of resilient arms biased toward one another and engageable in said recesses to secure said body to said adapter;
   (d) valve means for controlling relief of pressure within said body; and
   (e) single means extending laterally from said body for actuating said valve means, said single means including means for engaging the free ends of said resilient arms,
   (f) said single means being movable inwardly for first actuating said valve means to relieve pressure within said body and thereafter forcing apart said resilient arms to effect release of said body from said adapter.

3. The coupling recited in claim 2 wherein said arm-engaging means is wedge-shaped and the free ends of said resilient arms are flared for receiving said arm-engaging means therebetween.

4. A coupling for connecting a faucet to a receiver comprising:
   (a) an adapter for connection to the faucet, said adapter having a recess on its outer surface;
   (b) a body having an inlet for connection to said adapter and an outlet for connection to said receiver;
   (c) resilient means secured to said body and engageable in said recess to secure said body to said adapter;
   (d) a relief port in said body; and
   (e) a push button assembly extending laterally from said body comprising:
      (aa) a laterally extending valve for controlling relief of pressure through said relief port;

(bb) laterally projecting means for releasing said resilient means from said recess;
(cc) wall means connecting said valve and said releasing means, and
(dd) wall means for guiding said push button assembly for movement toward or away from said body;

(f) said push button assembly being arranged whereby the application of manual effort to the said connecting wall means to effect an uninterrupted unidirectional movement thereof first displaces said valve means to open said relief port and then causes said resilient means to disengage from said adapter.

5. A coupling for connecting a faucet to a receiver comprising:
(a) a tubular adapter for connection to the faucet, said adapter having a pair of recesses on diametrically opposite sides of its outer surface, said recesses being in a common plane;
(b) a body having an inlet for telescoping over said adapter coaxial therewith and an outlet for connection to said receiver;
(c) a U-shaped spring secured within said body, said spring having a pair of resilient arms straddling said inlet, each arm being biased to enter a recess to secure said body to said adapter;
(d) a relief port in said body;
(e) a push button assembly extending laterally from said body comprising:
  (aa) an integral laterally extending valve for controlling relief of pressure through said relief port;
  (bb) laterally projecting means engageable with said arms to spread the same for release from the respective recesses;
  (cc) an actuating means connecting said valve and said projecting means, said actuating means having a wall structure for manual operation of said assembly;
  (dd) means for normally biasing said push button assembly in a direction effecting closure of said valve and disposition of said spring arms within the recesses of said adapter, and
(f) said push button assembly being movable in the opposite direction upon application of manual effort against said wall structure, said last-named movement being effective first to actuate said valve to relieve pressure within said body and then to spread said resilient arms to permit withdrawal of said body from said adapter.

References Cited in the file of this patent
UNITED STATES PATENTS
3,064,678    Shames _____ Nov. 20, 1962
3,084,713    Parrish _____ Apr. 9, 1963